Dec. 28, 1965 D. C. JAMES 3,226,569

FAILURE DETECTION CIRCUITS FOR REDUNDANT SYSTEMS

Filed July 30, 1962 2 Sheets-Sheet 1

INVENTOR.
DWIGHT C. JAMES
BY
Earl C. Hancock
AGENT

FAILURE DETECTION CIRCUITS FOR REDUNDANT SYSTEMS

Filed July 30, 1962 2 Sheets-Sheet 2

INVENTOR.
DWIGHT C. JAMES
BY
Earl C. Hancock
AGENT

United States Patent Office 3,226,569

Patented Dec. 28, 1965

3,226,569

FAILURE DETECTION CIRCUITS FOR REDUNDANT SYSTEMS

Dwight C. James, Littleton, Colo., assignor to Martin-Marietta Corporation, Baltimore, Md., a corporation of Maryland Filed July 30, 1962, Ser. No. 213,381
9 Claims. (Cl. 307—88.5)

Figure 1:
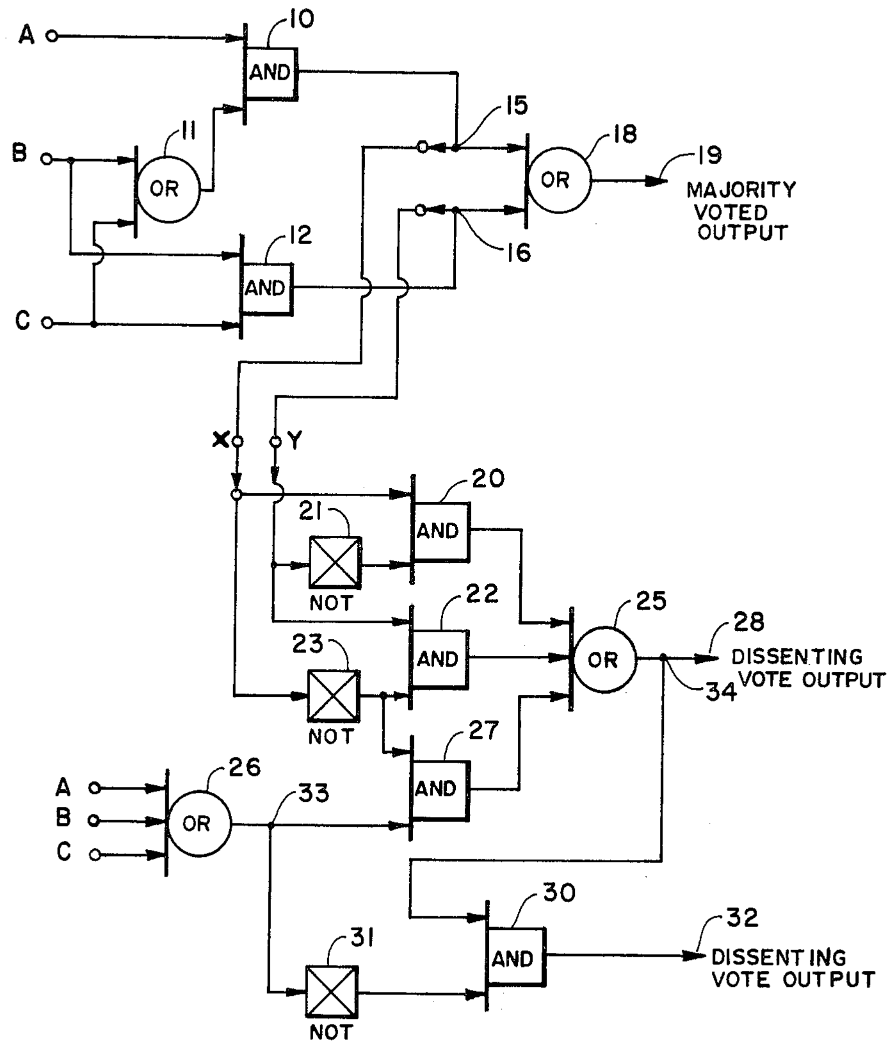

This invention relates to electronic systems that rely upon redundancy to increase the reliability of the operation thereof. More particularly, this invention relates to circuits for providing failure indications for use in conjunction with redundant electronic systems that employ majority voting circuits for producing an output therefrom. The present invention is useful in computers, industrial control systems, aircraft, missiles and a host of other applications where digital or on-off operations are involved.

The reliability of a system or component can be expressed as the statistical prediction of the number of operations that can be expected to be successfully performed. Several techniques have been used to increase the reliability of electronic systems and components and one such technique that has gained considerable acceptance is the redundancy technique. The redundancy technique is based upon the theory that a duplication of parts or circuitry for performing substantially identical operations will increase the reliability of the total system. This invention is concerned primarily with parallel redundancy wherein mutually identical circuits or circuit elements are connected in parallel so that the operation is performed simultaneously by the parallel circuits or elements thereby producing identical outputs when all elements are functioning properly. If one circuit or element should cease to operate, the other or others will continue to operate and thus prevent interruption of the mission.

Since one of the redundant circuits could fail in the "on" condition, successful operation of the system requires rejection of the output of the failed circuit or element. This rejection has been accomplished by circuits which perform an operation that has become known as majority voting. With three or more redundant elements operating in parallel, the majority voting circuit will produce an output only when the outputs of a majority of the redundant elements agree.

The previously known majority voting systems, however, were limited in that no positive indication was provided when a minority of the redundant circuits or elements had actually failed. Thus there was no indication of trouble and accordingly it was not possible to repair the equipment until a total failure had occurred. Another and even more serious limitation on the known majority voting systems is the fact that the voting circuitry must be in series with the information flow which naturally tends to downgrade the reliability achieved by the redundancy preceding it. That is, the existence of circuit failures within the voting circuit itself could go undetected thereby seriously jeopardizing the reliability of the system.

Accordingly, the present invention is an arrangement of logic circuits in conjunction with a majority voted system for providing a positive indication whenever the output or outputs of a minority of redundant circuits or elements do not agree with a majority of the redundant outputs. Further, the circuit arrangement of the present invention is capable of providing an indication whenever a failure has actually occurred in the majority voting circuits. To accomplish the foregoing, the circuitry of the present invention logically compares the inputs to the final OR stage of the majority voting circuits with each other and/or with the redundant output signals to determine the presence of a dissenting vote. Further, the circuitry of the present invention can be supplemented to include logic elements for comparing the dissenting vote output with the redundant circuit output signals for the purpose of providing a positive indication that something has gone wrong with the majority voting circuitry.

Figure 2:
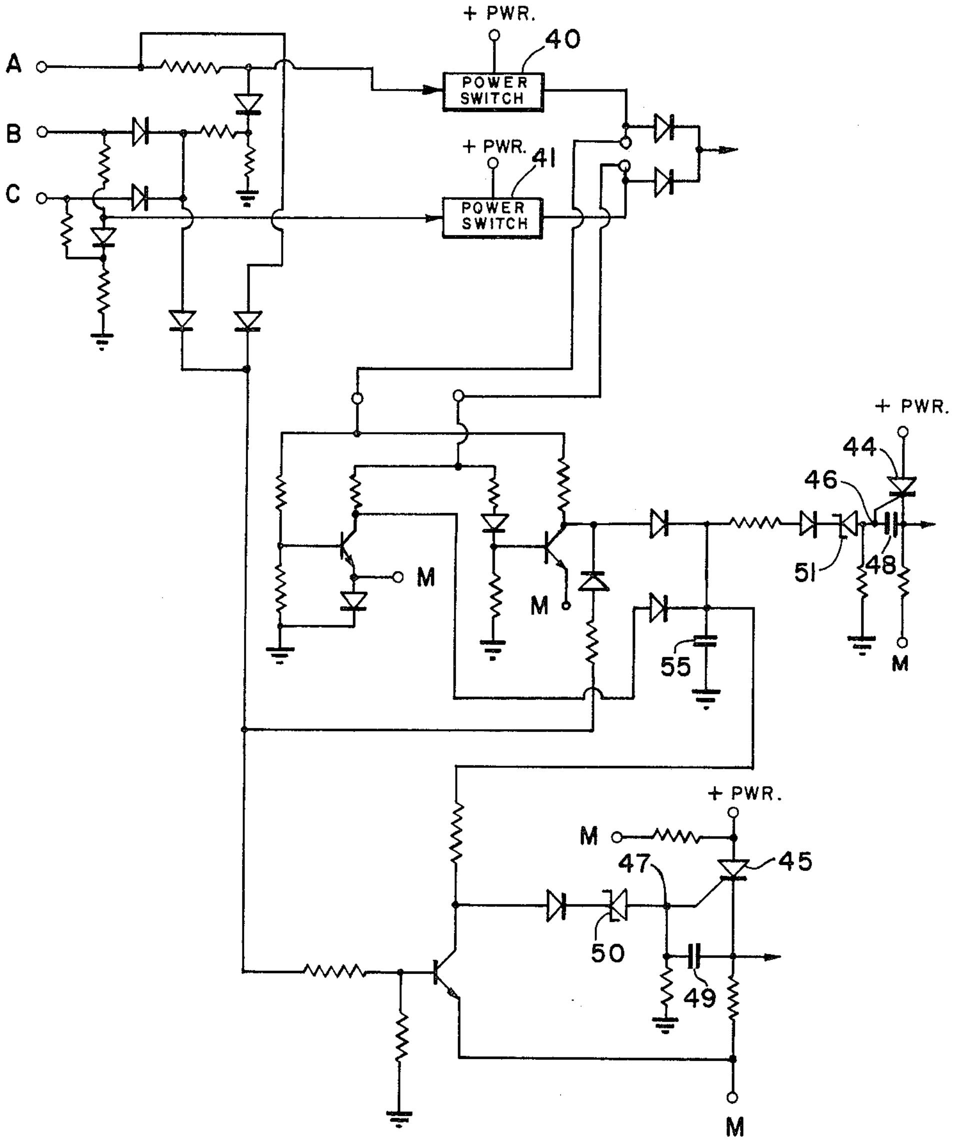

The novel features considered characteristic of this invention are set forth with particularity in the appended claims. The invention, however, both to its organization and preferred modes of operation as well as additional features and advantages thereof will be best understood from the following description when read in conjunction with the accompanying drawing in which:

FIGURE 1 is a logic block diagram of a typical embodiment of the present invention, and FIGURE 2 is a schematic diagram illustrating a typical arrangement of circuit components for performing the operations of FIGURE 1.

It should be understood at the outset that the description and equations hereinafter will be couched in Boolean algebra terms and symbols that are now well known in the computer industry. For instance, symbols such as AB or (A) (B) mean that an output occurs from a given circuit only when there is an "A" input AND a "B" input. In FIGURE 1, the symbol shown at 10 is a typical AND circuit symbol. In addition, A+B means that an output occurs from a given circuit when there is either an "A" input OR a "B" input. An OR circuit symbol is shown at 11 in FIGURE 1. There are many avaiable publications that explain and apply Boolean algebra such as, "Engineering Applications of Boolean Algebra," by Boris Beizer and Stephan Leibholz (1958, The Gage Publishing Company, 1250 6th Avenue, New York, N.Y.). References will also be made hereinafter to inverter or NOT circuits such as are shown at 21, 23 and 31 in FIGURE 1. A symbol with an apostrophe will be used in this description (i.e.: A') to indicate a NOT, meaning that a particular circuit will NOT produce an output only when an input signal A is present. That is to say, the NOT circuit may be designed to produce an "on" output unless an input is present.

FIGURE 1 shows a logic diagram of one of the many possible embodiments of the present invention. The particular circuit shown was chosen for purposes of simplifying the explanation of the invention since it employs only three redundant input signals A, B and C. Under ideal conditions, input signals A, B and C would be identical output signals produced by identical redundant circuits (not shown). It is desired to produce an output from input signals A, B and C whenever a majority of these three signals agree. Accordingly, a majority voting operation is needed. In Boolean terms, this means an output signal is to be produced when the following condition exists:

$$AB+BC+CA \tag{1}$$

Therefore signals B and C are passed through OR circuit 11 thereby providing input signals for AND circuit 10 of A, and B or C. The B and C signals are also passed through AND circuit 12. Thus, the signal appearing at terminal 15 is $A(B+C)$ while the signal appearing at terminal 16 is BC. By passing these two signals through OR circuit 18 the signal appearing at output 19 will be:

$$A(B+C)+BC \tag{2}$$

which reduces by Boolean operation to:

$$AB+AC+BC \tag{3}$$

which is the majority voted output in accordance with Equation 1. Thus it can be seen that a signal appears at output 19 only when a majority of input signals A, B and C agree. Output 19 would then be coupled to the subsequent circuitry so that the information therefrom would be utilized in a well known manner.

Through the majority voting feature, the system thus described has the advantage that no false signal will appear at output 19 when a failure of any one of the redundant circuits producing signals A, B and C has occurred. Another advantage of this system is that parallel paths are present through the majority voting portion thereby providing redundancy within the majority voting circuitry itself.

The disadvantage of the aforementioned circuitry without more is that no indication is provided when one of the input signals does not agree with the majority, a condition referred to as a dissenting or minority vote. This materially reduces the reliability of the system, of course. Further, no warning is produced if a portion of the majority voting circuitry should fail which, if a false signal should appear at output 19 as a result, could completely defeat the operation of the entire system and, in some applications, could prove extremely disastrous. The aforementioned disadvantages are substantially overcome by the circuitry now to be described.

The circuitry identified with reference numerals 20 through 28 is devoted to providing an indication that a dissent has occurred. The signals present at terminal 15 are coupled to AND circuit 20. In addition, the signals present at terminal 16 are passed through inverter or NOT circuit 21 and then coupled into AND circuit 20. To simplify the logic algebra, let:

$$X=A(B+C) \tag{4}$$

and $$Y=BC \tag{5}$$

Thus means that the signals at terminals 15 and 16 are X and Y respectively and the output of AND circuit 20 will be $XY'$. From this, it can be seen that an output will be produced by AND circuit 20 if no Y signal appears at terminal 16 which, of course, indicates that B, C or AND circuit 12 are registering a dissenting vote. Inasmuch as inverter 21 can only have two states (i.e.: a "0" or a "1"), circuits 20 and 21 will not produce an output when the opposite condition occurs as a result of a failure or dissent of the X vote.

Accordingly, the Y signal is additionally coupled directly to AND circuit 22 with the X signal being coupled thereto after passing through inverter 23. An output will be produced by AND circuit 22 only when a dissent condition occurs at terminal 15. The circuitry described up to this point will produce indications of a dissenting vote resulting from the failure of a signal to occur at either A, B or C or any other failure which results in disagreement of the X and Y signals.

To put it another way, any disagreement between X and Y is an indication of failure of elements A, B, C, 10, 11 or 12 to provide a "1" when input signal conditions are such as to require a "1" for proper circuit operation. Furthermore, disagreement between X and Y may indicate a "1" output from elements 10, 11 or 12 when input signal conditions are not requiring a "1" output but rather a "0" output.

Thus monitoring of points X and Y provides a failure information when elements A, B, C, 10, 11 or 12 provide erroneous zeros ("0") (i.e.: fail to come on). In addition, X and Y disagreement indicates "on" or "1" failure of elements 10, 11 and 12.

It is possible for A, B or C to fail in the "on" or "1" condition which would not produce any apparent disagreement between signals X and Y. To provide for this condition, signals A, B and C are passed through OR circuit 26 with the output thereof being combined in AND circuit 27 with the output of NOT circuit 23. Thus an output signal will result from AND circuit 27 when one of signals A, B or C are "on" while the other two are "off." Such a condition would never produce any X and Y signal disagreement at terminals 15 and 16 but is a failure for which an indication should be produced since degradation of reliability will result. To illustrate that elements 26 and 27 serve to monitor "on" or "1" failures of A, B or C, the output of circuit 27 can be expressed in logic terms as:

$$X'(A+B+C)=(A'+B'C')(A+B+C) \tag{6}$$

By passing the output signals of AND circuit 20, 22 and 27 through OR circuit 25, a master signal can be produced at output 28 which will be indicative of the existence of any dissenting vote among the redundant signals A, B or C. This dissenting vote ouput at 28 can be expressed as:

$$XY'+X'Y+(A'+B'C')(A+B+C) \tag{7}$$

It can now be appreciated that the dissenting vote indicating circuitry described hereinbefore not only monitors and reports any failures in the redundant elements (A, B and C) but failures in the voting circuitry (elements 10, 11 and 12) as well.

The methods and means of utilization for dissenting vote signals at output 28 will be readily apparent to those having normal skill in the art. Actuation of a simple warning light could be sufficient for instance. When such a light is turned on, a quick check of the circuitry in the system could be accomplished so that repairs and maintenance can be performed to return the system to its original state of reliability probably without even interrupting the operation of the system.

The system thus far described could be considered quite sufficient in and of itself for many applications. In some instances, however, it may be desirable to provide a separate indication of the condition wherein some component of the majority voting circuitry has failed in such a manner that a majority vote indication is being produced with no A, B or C signals being present, that is with A, B and C all being "off" or "0." To particularly sense this condition, the dissenting vote output can be introduced to AND circuit 30 along with the output of NOT circuit 31 which would be A'B'C' as can be seen from FIGURE 1. Accordingly, output 32 will be actuated only when no signals are present at A or B or C but a dissenting vote is being indicated at 28. The expression for output 32 will be equivalent to:

$$A'B'C'(XY'+XY'+X')(A+B+C) \tag{8}$$

Indications appearing at output 32 can be used to reveal the presence of an improper output signal from the majority voting circuitry (differentiated from redundant circuit failures) so that repairs could be promptly made. In fact, output 32 could even be used to provide an emergency shutdown of the system or other automatic corrective action. It should be appreciated that the circuitry from circuit points 33 and 34 to output 32 represents an additional feature of the present invention and is not required for the production of a dissenting vote indication.

FIGURE 2 is a schematic diagram of a system that is essentially the same as that of FIGURE 1 except that more detailed circuit inter-relationships are revealed along with some additional features. The circuitry to perform the functions of the logic symbols of FIGURE 1 is well known in the art and can be obtained from several publications. for instance, one reference book useful in designing these circuits is the book entitled, "Pulse and Digital Circuits," by Jacob Millman and Herbert Taub (McGraw-Hill Book Company, Inc., 1956, New York, N.Y.). Therefore, the particular logic circuits shown in FIGURE 2 will not be described in detail in the interest of brevity.

The circuit point M appearing at several places in FIGURE 2 simply indicates a common connection between all of the terminals with which it is associated. It should be noted that power switches 40 and 41 are included in the majority voting circuitry for the purpose of amplifying the majority vote signals.

The dissenting vote output circuit includes silicon controlled rectifier 44 and the majority vote failure indicator circuit includes silicon controlled rectifier 45 which are both for the purpose of locking their associated outputs in the "on" condition. This modification is useful in circuits where the redundant system input signals A, B and C are separated by long intervals. There are, of course, many memory type arrangements for accomplishing this.

Upon the application of power to the system, the transient voltage at circuit points 46 and 47 could cause false failure indications. Accordingly, capacitors 48 and 49 are included for voltage divider purposes to prevent these false indications.

Zener diodes 50 and 51 and capacitor 55 are for the purpose of reducing the sensitivity of the circuit to short term transients. The length of time required to overcome the avalanche voltage of zener diodes 50 and 51 is set at slightly less than the time duration of the proper actuating signals.

Although the present invention has been described with particularity, the invention is not intended in any way to be limited thereto. For instance, the invention is not limited to majority voted circuits used in conjunction with three input signals as has been shown and described hereinbefore but can be expanded by logic algebra to include an almost infinite number of inputs. Many variations within the spirit of this invention will be apparent to those having normal skill in the art.

What I claim is:

1. A dissenting vote indicator for use in conjunction with a majority voted circuit having a plurality of redundant input signal and at least two possible voted outputs comprising first circuit means constructed and arranged for comparing said voted outputs and producing a first signal indicative of a disagreement therebetween, second circuit means for comparing said plurality of redundant signals with at least one of said voted outputs, said second circuit means being constructed and arranged for producing a second signal indicative of the presence of at least one of said redundant input signals in the absence of said voted outputs, and third circuit means coupled to be actuated by the presence of either said first or second signals, whereby said third circuit means will be actuated by the presence of a dissenting vote signal among said redundant signals.

2. A dissenting vote indicator in accordance with claim 1 which includes fourth circuit means for comparing said plurality of redundant input signals with a signal indicative of the actuation of said third circuit means, said fourth circuit means being constructed and arranged for producing an output in response to the presence of said actuation indicating signal and the absence of said redundant input signals, whereby an output signal from said fourth circuit means will indicate an "on" failure of the majority voting circuitry.

3. A dissenting vote indicator for use in conjunction with a majority voted circuit having a plurality of redundant input signals and an output stage operable in response to either of first or second voted output signals comprising first circuit means constructed and arranged for producing a first signal in response to the presence of said first voted signal and the absence of said second voted signal, second circuit means constructed and arranged for producing a second signal in response to the presence of said second voted signal and the absence of said first voted signal, third circuit means constructed and arranged for producing a third signal indicative of the presence of at least one of said redundant input signals in the absence of said voted outputs, and fourth circuit means operable for providing an output indicative of the presence of at least one of said first, second and third signals, whereby appearance of an output from said fourth circuit means indicates the presence of a dissenting vote signal among said redundant signals.

4. A dissenting vote indicator in accordance with claim 3 which includes a fifth circuit means coupled to receive said redundant input signals and said indicative output from said fourth circuit means, said fifth circuit means being constructed and arranged for producing an output in response to the presence of said indicative output and the absence of said redundant input signals, whereby an output from said fifth circuit means indicates an "on" failure of the majority voting circuitry.

5. A dissenting vote indicator for use in conjunction with a majority voted circuit having a plurality of redundant input signals and an output stage operable in response to either of first and a second voted output signals, said dissenting vote indicator comprising a first NOT circuit coupled to receive said second voted signal for producing an output interruptable by the presence of said second voted signal, a first AND circuit coupled for receiving said first voted signal and the output of said first NOT circuit, a second NOT circuit coupled to receive said first voted signal for producing an output interruptable by the presence of said first voted signal, a second AND circuit for receiving said second voted signal and the output of said second NOT circuit, first OR circuit means constructed and arranged for receiving said redundant input signals and for producing an output in the presence of any of said redundant signals, a third AND circuit coupled for receiving the output of said first OR circuit and the output of one of said NOT circuits, a second OR circuit means for receiving the outputs of said first, second and third AND circuits and for producing an output in response to the prasence of any of said AND circuit outputs, whereby the presence of an output from said second OR circuit means is indicative of at least one dissenting vote among said redundant signals.

6. A dissenting vote indicator in accordance with claim 5 which includes a third NOT circuit coupled for receiving said redundant signals and constructed and arranged for producing an output interruptable by the presence of any of said redundant signals, a fourth AND circuit connected for producing an output in response to the outputs of said second OR circuit and said third NOT circuit, whereby an output from said fourth AND circuit results from an "on" failure of the majority voting circuitry.

7. A dissenting vote indicator in accordance with claim 6 which includes means for maintaining the outputs from said second OR circuit and from said fourth AND circuits in the "on" condition in response to said inputs of a predetermined duration.

8. A dissenting vote indicator for use in conjunction with a majority voted circuit having a plurality of redundant input signals and at least first and second voted output signals comprising: first circuit means constructed and arranged for producing a first signal in response to the presence of said first voted output signal and the absence of said second voted output signal; second circuit means constructed and arranged for producing a second signal in response to the absence of said first voted output signal and the presence of said second voted output signal; and third circuit means for providing an output indicative of the presence of either one of said first or second signals.

9. A dissenting vote indicator for use in conjunction with a majority voted circuit having a plurality of redundant input signals and at least first and second voted output signals comprising: first circuit means constructed and arranged for producing a first signal in response to the presence of said first voted output signal and the absence of said second voted output signal; second circuit means constructed and arranged for producing a second signal in response to the absence of said first voted output signal and the presence of said second voted output signal; third circuit means for comparing said pluraltiy of redundant input signals with at least one of said voted output signals, said third circuit means being constructed and arranged for producing a third signal indicative of the presence of at least one of said redundant input signals in the absence of said at least one of said voted output signals; and means for detecting the presence of any of said first, second, or third signals.

References Cited by the Examiner

UNITED STATES PATENTS

| | | | |
|---|---|---|---|
| 2,693,907 | 11/1954 | Tootill | 328—92 |
| 2,942,193 | 6/1960 | Tryon | 328—92 |

ARTHUR GAUSS, *Primary Examiner.*